(12) United States Patent
Thompson

(10) Patent No.: US 6,592,088 B2
(45) Date of Patent: Jul. 15, 2003

(54) TOOLLESS LOCKING MOUNT

(76) Inventor: Eric Thompson, 14206 Southeast 165th Pl., Renton, WA (US) 98058

( * ) Notice: Subject to any disclaimer, the term of this patent is extended or adjusted under 35 U.S.C. 154(b) by 0 days.

(21) Appl. No.: 09/769,187

(22) Filed: Jan. 24, 2001

(65) Prior Publication Data

US 2002/0014571 A1 Feb. 7, 2002

Related U.S. Application Data

(60) Provisional application No. 60/177,757, filed on Jan. 24, 2000.

(51) Int. Cl.$^7$ .............................................. A47B 96/06
(52) U.S. Cl. ................... 248/220.1; 248/551; 248/488; 403/217; 403/322.1
(58) Field of Search ................... 248/551, 544, 248/499, 500, 220.1, 221.11, 222.52, 222.13, 488, 466, 680, 552, 681, 553, 222.14; 70/14; 361/679; 403/217, 219, 322.1, 325, 403, 382, 374.3, 373; 108/157.18; 52/309.9; 40/783, 785

(56) References Cited

U.S. PATENT DOCUMENTS

| | | | | |
|---|---|---|---|---|
| 3,049,323 A | * | 8/1962 | Peterka ........................ 248/466 |
| 3,424,418 A | * | 1/1969 | Freedman et al. ........... 248/304 |
| 3,590,458 A | * | 7/1971 | Day ............................ 29/281.4 |
| 3,747,540 A | * | 7/1973 | Salkoff et al. ............. 248/220.1 |
| 3,785,185 A | * | 1/1974 | Kerr ............................... 70/68 |
| 4,010,924 A | * | 3/1977 | Parsons et al. ........... 248/226.1 |
| 4,190,157 A | * | 2/1980 | Chatham ................. 248/475.1 |
| 4,247,090 A | * | 1/1981 | Hahn et al. .................. 269/41 |
| 4,432,590 A | * | 2/1984 | Lawrence et al. ........... 312/257 |
| 4,676,687 A | * | 6/1987 | Koffler ........................ 403/386 |
| 4,724,643 A | * | 2/1988 | Marsh ........................ 52/509 |
| 4,779,180 A | * | 10/1988 | Ruiz ...................... 248/488 X |
| 5,199,681 A | * | 4/1993 | Reidy ...................... 248/220.1 |
| 5,369,549 A | | 11/1994 | Kopp et al. |
| 5,371,994 A | * | 12/1994 | Waters .................. 248/488 X |
| 5,436,792 A | | 7/1995 | Leman et al. |
| 5,799,915 A | * | 9/1998 | Morey .................... 248/488 X |
| 6,034,867 A | | 3/2000 | Seo |
| 6,212,918 B1 | * | 4/2001 | Kravtin ........................ 70/14 |

FOREIGN PATENT DOCUMENTS

| | | | |
|---|---|---|---|
| DE | 29710601 | * | 9/1997 |
| EP | 0 807 878 A1 | | 11/1997 |

* cited by examiner

*Primary Examiner*—Ramon O. Ramirez
*Assistant Examiner*—Tan Le
(74) *Attorney, Agent, or Firm*—J. Michael Neary

(57) ABSTRACT

A universal mounting mechanism for holding objects, such as electrical, medical, optical or audio/visual components needing secure physical connection to another surface in such a way that the mounted object can be easily and quickly installed and removed. It locks the object by providing surfaces on three planes that firmly engage the object so it does not move during transportation or when mounted on a fixed surface. It is low in profile so it does not obstruct the use of the items being held. The mount has no loose parts that can be lost during installation or removal of the mounted objects. Furthermore, the mount has the added feature of locking into either the open or closed position. Because the range of motion is limited, the top of the mount will not move into a position where it could be damaged or obstruct the use of adjacently mounted items.

2 Claims, 5 Drawing Sheets

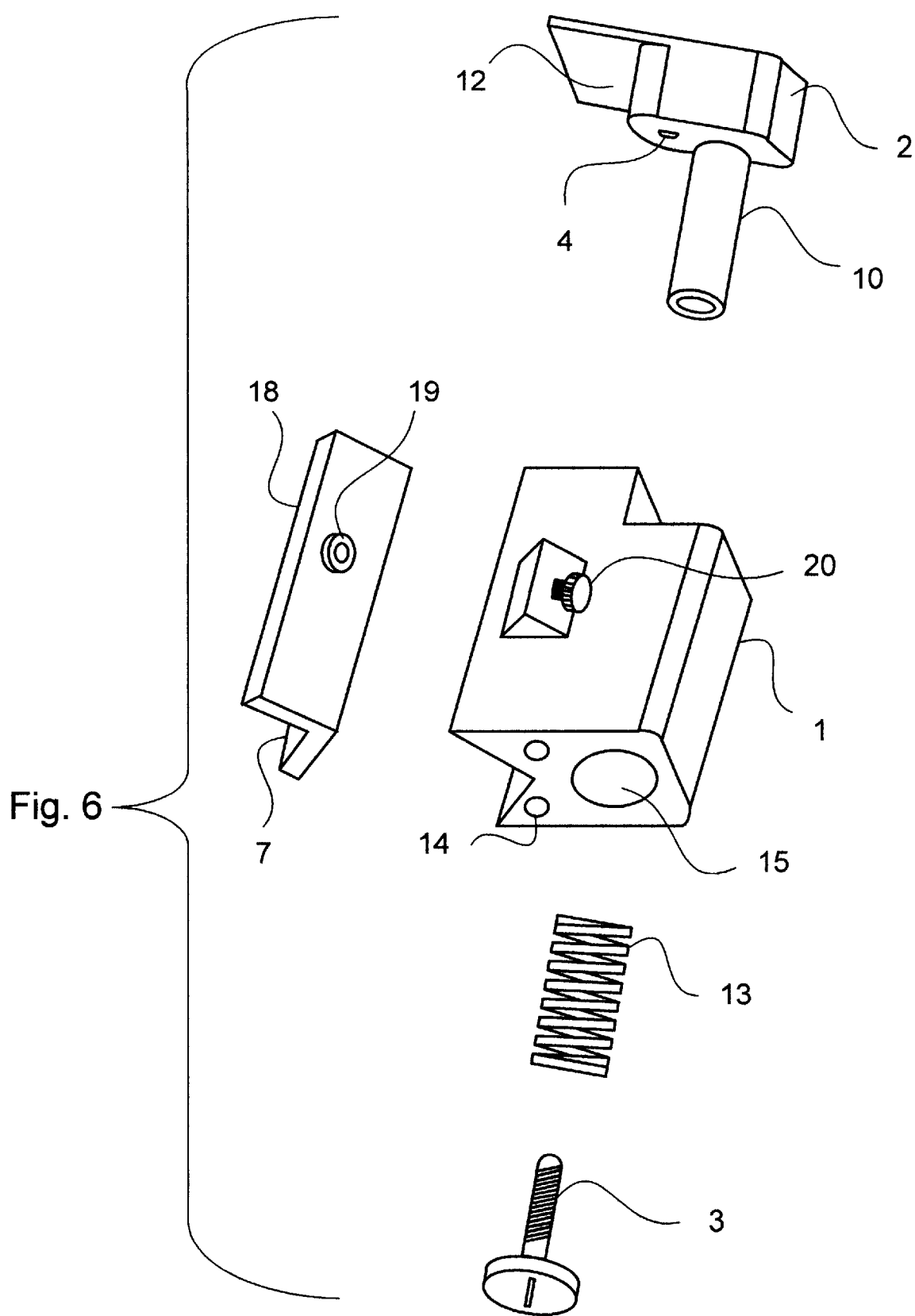

US 6,592,088 B2

TOOLLESS LOCKING MOUNT

This is related to U.S. Provisional Application No. 60/177,757 filed on Jan. 24, 2000 and entitled "Toolless Locking Mount".

BACKGROUND OF THE INVENTION

1. Field of the Invention

This invention relates to a physical mounting mechanism designed to act as a support for any objects, electronic or otherwise that need to be secured for movement or transport. The invention not only secures items during transport, but it also allows an easy-open and easy-close capability for quick installation or removal of the mounted object. The mount functions as a support for electronics, mobile computers, and medical equipment where ease of installation and removal, and security of attachment are important.

2. Background Art

Mounts of many types have been designed and created. However, none have provided a universal mount that allows easy installation and removal without use of tools and securely holds the object to be mounted even if it is inverted. As an example, this mount allows a laptop computer to be secured at the base allowing the screen to be moved up and down without becoming dislodged from the mounts when the base is secured.

Individual objects often need to be securely connected to a separate mobile or fixed surface. At the same time users need to quickly and easily install and later remove these objects, such as electronics, marine products, monitors, etc. with various shapes and sizes. Therefore, the mechanical connection needs to be a universal mount that can be applied to objects of differing shapes and sizes.

SUMMARY OF THE INVENTION

This invention provides a mount that operates quickly and easily. It enables installation or removal of electronic components, laptop computers, etc. with very little effort. This invention, at the most fundamental level, secures an object being mounted on multiple planes thereby preventing both horizontal and vertical movement of the mounted object.

This mounting mechanism provides uprights with a surface area on two intersecting vertical planes and one horizontal plane. The surface on the horizontal plane swings aside, allowing the mounted object to slide up and away along the vertical planes thus releasing the object. These uprights serve two functions: they prevent side movement of the objects being mounted, and they have a small cap that rotates over the object to either allow vertical movement of the mounted object for removal or prevent the movement thus keeping the object surely in place.

This invention includes special capabilities beyond those of a simple mount. This mount has three fixed positions. One position is the "closed" position where the cap is covering the object and preventing movement of the object mounted. The next position is taken when the user rotates the cap to the right using the thumb and forefinger, i.e. tool-less opening of the mount. The third option is to rotate the top to the left thus opening the mount and allowing removal of the object.

The mount consists of two main parts—a top and a base. The top rotates over the base and locks it into either a closed or open position. The open position can be either to the right or the left. However, the open position goes only as far as necessary to allow the secured object to be released from the mount. This way the top itself never releases from the base of the mount, nor does it open so wide as to interfere with other objects near it. A spring inside the mount provides enough pressure to prevent the mount from moving inadvertently while at the some time allowing the user of the mount to open it without tools.

BRIEF DESCRIPTION OF THE DRAWINGS

The invention and its many attendant benefits and advantages will become more clear upon reading the following description of the preferred embodiment in conjunction with a review of the following drawings, wherein:

FIG. 6 is a perspective view of another embodiment of the mounting mechanism shown in FIGS. 1 and 2, having the capability to be tightened against the object to be secured.

DETAILED DESCRIPTION OF THE PREFERRED EMBODIMENT

Figure 1:
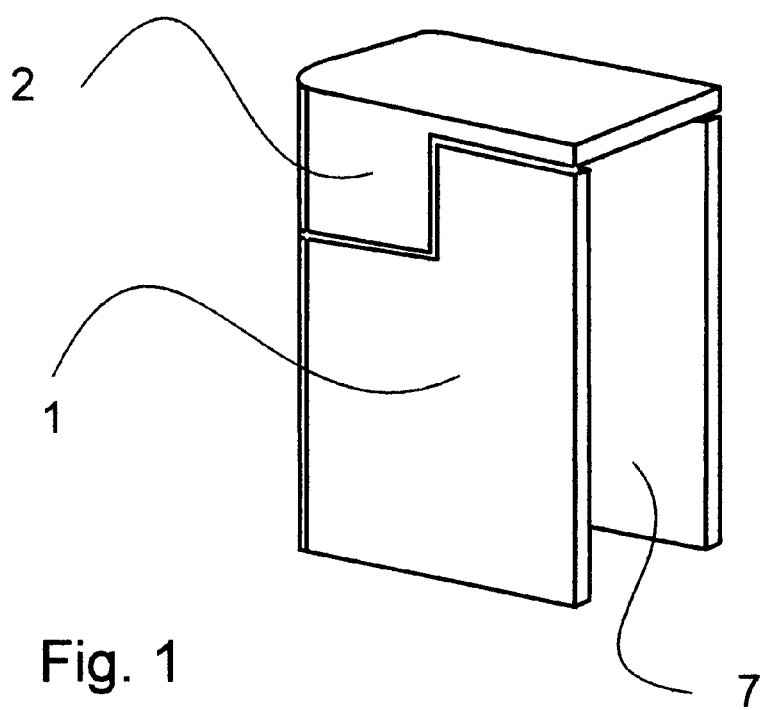
FIG. 1 is a perspective view of a mounting mechanism in accordance with this invention in the closed position.
Figure 2:
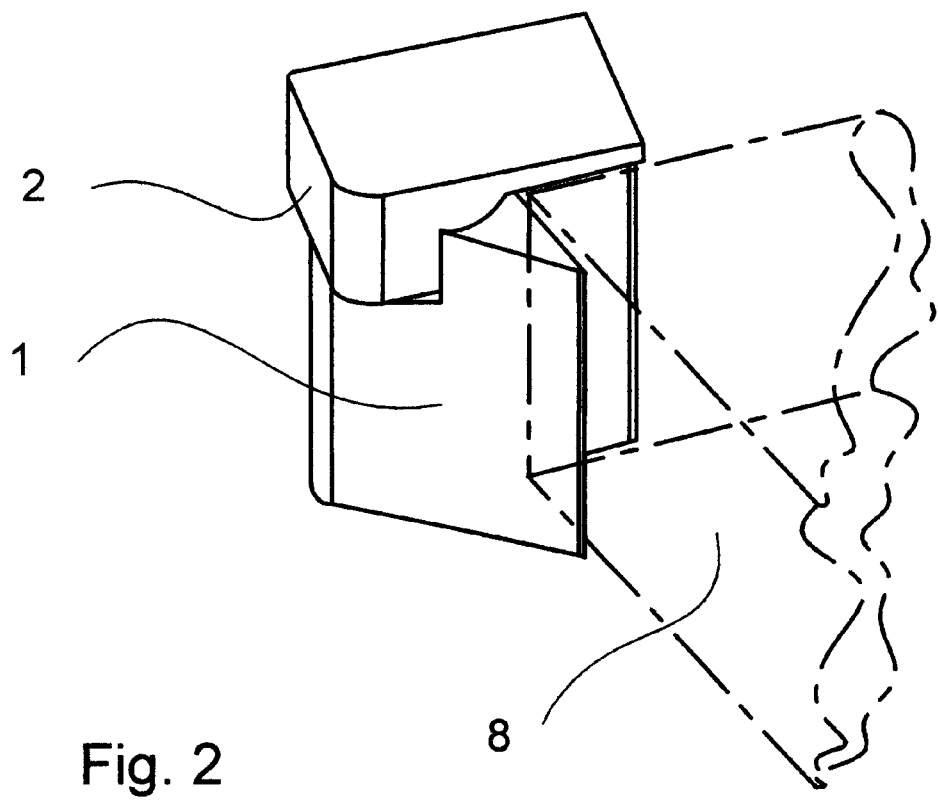
FIG. 2 is a perspective view of the mounting mechanism shown in FIG. 1 in the open position, shown at one corner of an object, illustrated in phantom, to be secured in position with several of the mechanisms shown in FIGS. 1 and 2.
Figure 3:
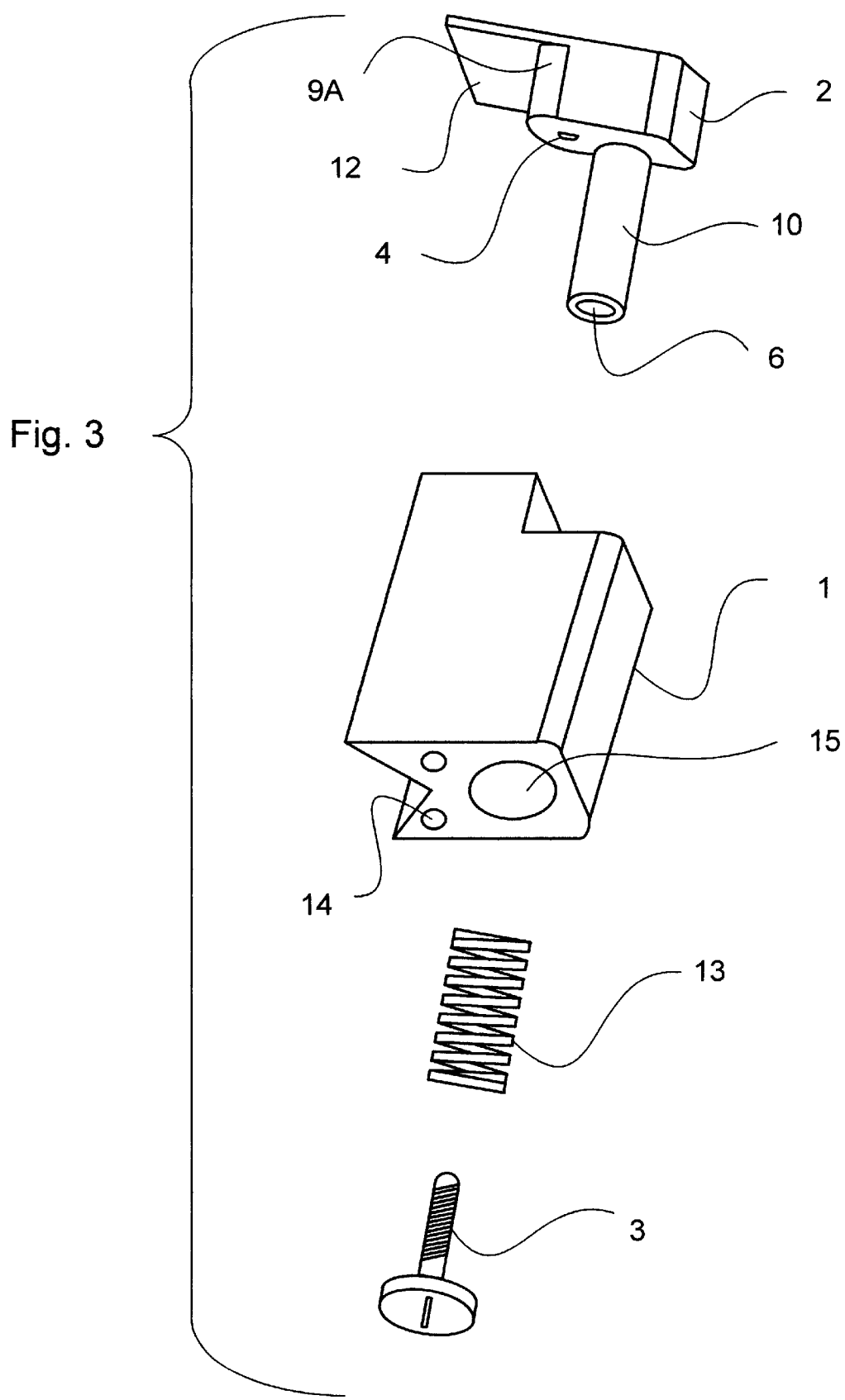
FIG. 3 is an exploded perspective view of the mounting mechanism shown in FIG. 1, from the back side.

Turning now to the drawings, wherein like reference numerals indicate identical or corresponding parts, and more particularly to FIGS. 1–3 thereof, a mounting mechanism in accordance with this invention is shown having a base 1 on the top of which is pivotally mounted a top 2. The underside of the top 2 has a nub 4 that clicks into one of three shallow notches 5 in the top surface of the base 1, shown in FIG. 4. The nub 4 facilitates the locking functionality of the mounting mechanism by clicking into the one of three positions, as described in more detail below. The center notch has two sloping sides, and the two end notches have a sloping side on the side adjacent the center notch, and a vertical side on the other side, opposite the sloping side. The notches hold the nub 4 in any of the three positions represented by the position of the notches, but the sloping sides of the notches 5 enable the nub 4 to slide up and over the notches 5 when the top is turned by hand from one position to the next position. When the top 2 is turned so the nub is in either of the two end notches, the nub engages the vertical side at the outside angular end of the notch 5 to prevent the top 2 from being turned any further in that direction. In this way, the cap or top 2 of the mounting mechanism swivels only the necessary distance to open the mounting mechanism and no further, eliminating the possibility that the cap 2 of the mounting mechanism could obstruct other objects or get into the way.

Figure 5:
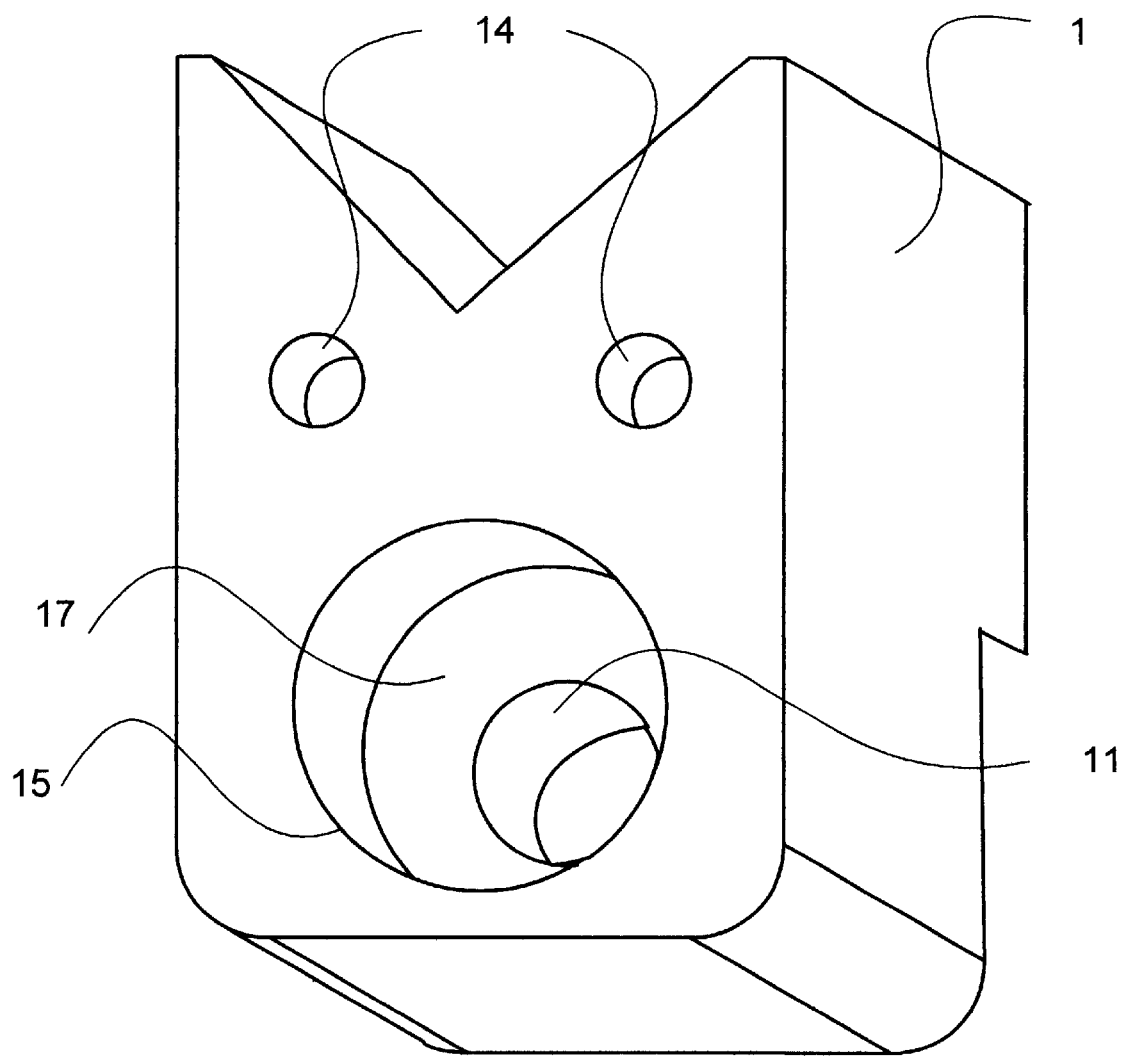
FIG. 5 is a perspective view of the base of the mount shown in FIG. 4 from the bottom.

The preferred scheme for enabling the nub to ride out of one notch 5, over the intervening land 5A between the notches, and into the next notch is shown in FIG. 3. A threaded fastener such as a machine screw 3 is threaded into a tapped hole 6 in a shaft 10 that is stud-welded or integral with underside of the top or cap 2. The shaft 10 extends through a bore 11 which guides the cap 2 for rotation about the axis of the shaft 10 and also guides the shaft for translation in the direction of the axis of the shaft 10. The bore 11 is enlarged at its lower end to a larger diameter bore 15, best shown in FIG. 5, and forms a shoulder 17 at the transition between the bores 11 and 15. The enlarged bore 15 receives a compression spring 13, shown in FIG. 3, and the head of the screw 3. The screw head compresses the spring between the screw head and the shoulder 17 so that the spring exerts a steady tension through the screw 3 to the shaft 10 to yieldably hold the cap 2 down against the top surface of the base 1. The tension exerted by the spring 13 can be adjusted by how far the screw 3 is threaded into the tapped hole 6 in the shaft 10 so that the cap 2 can move freely enough to be easily rotated to the open or closed position while at the same time having sufficient tension to hold the object and not vibrate.

As shown in FIG. 2, one face 7 of the base 1 has an inwardly opening angled portion that locates a corner of the object 8 to be held by the mounting mechanisms. The face 7 has two diverging surfaces for engaging two non-parallel surfaces of the object 8, typically at its corner. A pair of tapped holes 14 in the underside of the base 1 receive screws (not shown) by which the base 1 is attached to a mounting plate or the like on which the object 8 is supported.

Figure 4:
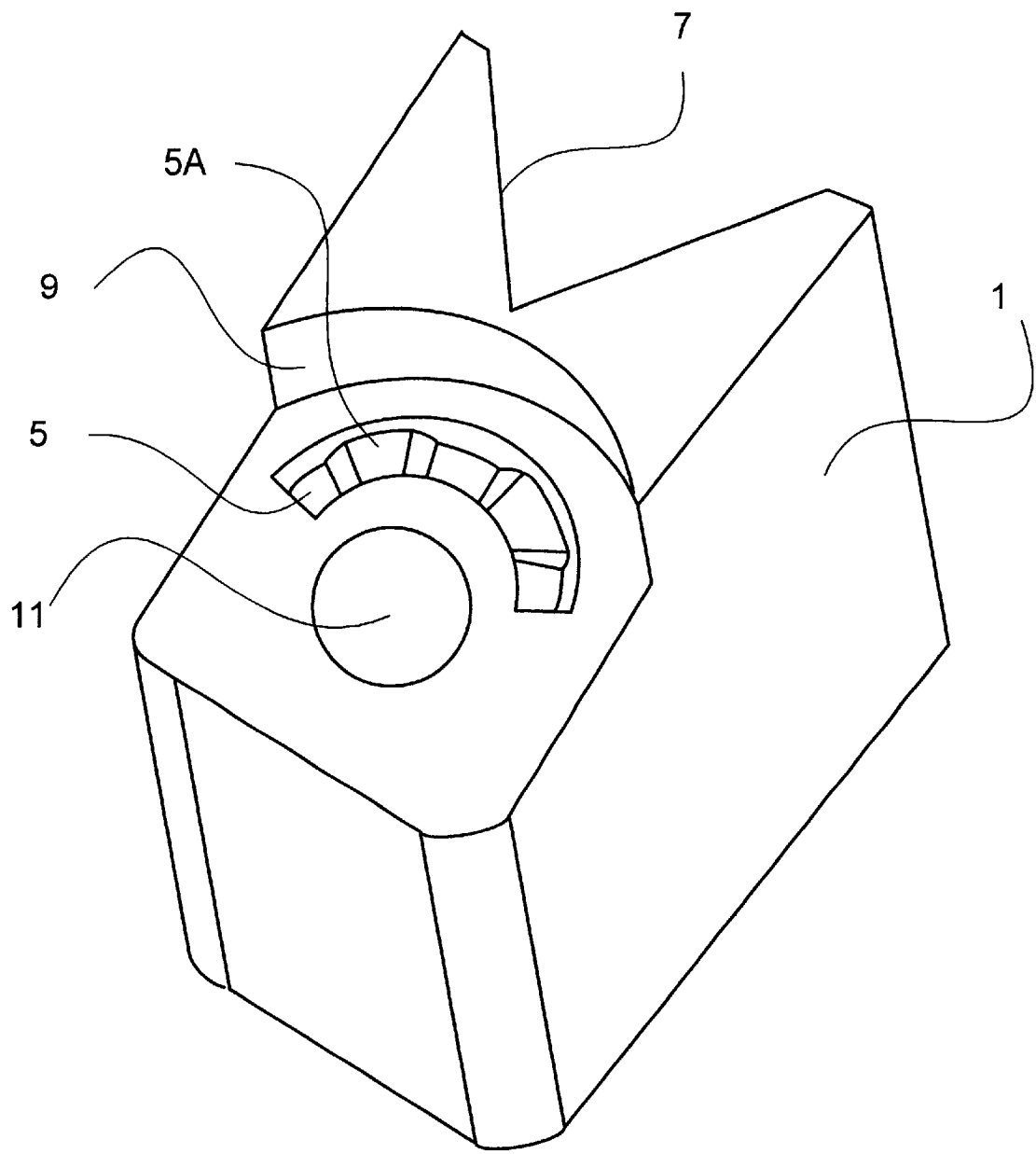
FIG. 4 is a perspective view of a shorter version of the base of the mount from the top, showing the construction that allows the three position locking functionality of the mount.

As shown in FIG. 4, the rear portion of the base 1 at the top is recessed to receive the cap 2. The front surface of the recess has a partial cylindrical concave surface 9 having a center of curvature on the axis of the bore 11. The cap 2 has a corresponding convex partial cylindrical surface 9A under a brim 12 that overlies the top of the object 8 when the cap 2 is turned to the closed position shown in FIG. 1. The center of curvature of the surface 9A lies on the axis of the shaft 10. The radius of the surface 9A is slightly smaller than the radius of the surface 9, so the surface 9 on the assembled device will accommodate the surface 9A of the cap 2, and the bore 1 will receive and guide the shaft 10.

In operation, several bases 1 are attached to a mounting plate or the like (not shown) at selected positions around the intended location of the object 8. In the case of a rectangular or square object 8, one base 1 would typically be located at each of the four corners of the object 8 unless it is held at one side by a fixed holder, in which case only two bases 1 would be used, on the corners opposite the fixed holder. The position of the bases 1 are set so that the angled faces 7 are close to or in sliding contact with the corner surfaces of the object 8 when it is lowered into the outline defined by the angled surfaces 7. The height of the bases 1 can be chosen to correspond with the height of the object, as shown in FIG. 2, so the brim 12 of the cap 2 overlies the top surface of the object 8 at its corner when the cap 2 is pivoted to its closed position illustrated in FIG. 1. The spring 13 compresses when the cap 2 is pivoted, allowing the cap 2 to lift slightly so the nub 4 can slide up the sloping surface of the notch 5 that it is in and slide across the land 5A and then drop into the center notch 5 where it is held until the cap 2 is rotated to the open position shown in FIG. 2 to allow the object 8 to be lifted out for quick and easy removal.

In another embodiment, shown in FIG. 6, a clamping mechanism is provided for moving the face 7 of the base 1 into firm contact with the object 8. In the embodiment shown in FIG. 6, the manner of moving the face 7 is by positioning the face 7 on an angle piece 18 which has a swivel boss 19 on each of the two outside faces of the angle piece 18 for attachment to the base 1. A screw 20 is threaded into a boss on each side of the base 1 and has an end engaged in the swivel connector 19. This arrangement enables the face 7 to be moved firmly into contact with the surfaces of the object and is of particular utility for objects that may have some vibration, such as audio components, medical instruments, sonic cleaning or treating apparatus and the like. Other clamping mechanisms are also possible for moving the face 7 against the object, such as mounting the base 1 on a linear bearing on the mounting plate so the entire base may be moved toward the object to bring the face 7 into contact with the object.

Obviously, numerous modifications and variations of the several embodiments described above are possible and will become apparent to those skilled in the art in light of this disclosure. Also, many functions, objects and advantages are described in the preferred embodiments, but in some uses of the invention, not all of these functions, objects and advantages would be needed, desired or attained. Therefore, I contemplate the use of the invention using fewer that the complete set of noted functions and advantages. Moreover, several species and embodiments are disclosed herein, but not all are specifically claimed in species claims, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all the disclosed species and embodiments, and the various modifications and variations, and the equivalents thereof, are to be considered within the spirit and scope of the invention as defined in the following claims, wherein

I claim:

1. A mounting mechanism for securing an object to a supporting surface, comprising:

four uprights, each having a bottom end for attachment to said supporting surface in an array surrounding a space to be occupied by said object, and each having a top end with a swiveling top cap overlying said upright;

each said upright having an angled recess on upright surfaces thereof facing said space and defined by two intersecting vertical planes for engaging outside corners of said object and preventing lateral movement of said object parallel to said supporting surface;

said swiveling top cap having an underside on a horizontal plane for overlying an upwardly facing surface of said object when said object is in said space, to prevent movement of said object away from said supporting surface;

a spring inside said upright and connected between said top cap and said upright, said spring biased in tension to provide pressure to hold said mount against moving inadvertently while allowing a user of said mounting mechanism to open said top cap by hand to release said object.

2. A mounting mechanism as defined in claim 1, further comprising:

a shaft, having a longitudinal axis, extending from said underside of said top cap and into a bore in said upright to guide said top cap for rotation about said axis, and also to guides said shaft for translation in the direction of said axis during rotation of said shaft.

* * * * *